United States Patent
Balan et al.

(10) Patent No.: US 7,315,769 B2
(45) Date of Patent: Jan. 1, 2008

(54) MULTI-TIER BENEFIT OPTIMIZATION FOR OPERATING THE POWER SYSTEMS INCLUDING RENEWABLE AND TRADITIONAL GENERATION, ENERGY STORAGE, AND CONTROLLABLE LOADS

(75) Inventors: Chellappa Balan, Niskayuna, NY (US); Sumit Bose, Niskayuna, NY (US); Zhihong Ye, Austin, TX (US); Jovan Bebic, Clifton Park, NY (US); Juan de Bedout, West Glenville, NY (US); Yan Liu, Ballston Lake, NY (US); Luis Garces, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/263,420

(22) Filed: Oct. 31, 2005

(65) Prior Publication Data

US 2007/0100503 A1    May 3, 2007

(51) Int. Cl.
*G05D 17/00*    (2006.01)
*H02J 3/38*    (2006.01)

(52) U.S. Cl. .................................... 700/286; 700/291
(58) Field of Classification Search .............. 700/266, 700/273, 286, 291; 290/43
See application file for complete search history.

(56) References Cited

U.S. PATENT DOCUMENTS

| | | | |
|---|---|---|---|
| 6,483,682 B1 * | 11/2002 | Reynolds ..................... 361/63 |
| 6,745,105 B1 * | 6/2004 | Fairlie et al. ................ 700/273 |
| 6,841,893 B2 | 1/2005 | Maiwald et al. ............... 290/43 |
| 2003/0132097 A1 * | 7/2003 | Kenet et al. ................... 203/11 |

* cited by examiner

*Primary Examiner*—Kidest Bahta
*Assistant Examiner*—Charles Kasenge
(74) *Attorney, Agent, or Firm*—Ann M. Agosti; Patrick K. Patnode

(57) ABSTRACT

A plurality of power generating assets are connected to a power grid. The grid may, if desired, be a local grid or a utility grid. The power grid is connected to a plurality of loads. The loads may, if desired, be controllable and non-controllable. Distribution of the power to the loads is via a controller that has a program stored therein that optimizes the controllable loads and the power generating assets. The optimization process is via multi-tier benefit construct.

21 Claims, 2 Drawing Sheets

MULTI-TIER BENEFIT OPTIMIZATION FOR OPERATING THE POWER SYSTEMS INCLUDING RENEWABLE AND TRADITIONAL GENERATION, ENERGY STORAGE, AND CONTROLLABLE LOADS

BACKGROUND OF THE INVENTION

Most energy produced today is derived from fossil fuels such as oil, coal and natural gas. However, these energy sources all have significant disadvantages including pollution, periodic shortages and escalating costs of extracting the fuels.

By contrast, solar, wind and hydroelectric energy systems all offer the advantages of being relatively safe and reliable. Moreover, these technologies have the common advantage of drawing their power from sources that are virtually inexhaustible. However, this is not to say these technologies are without difficulties. One difficulty with these technologies is that the underlying energy sources i.e., wind, sunlight and water can be subject to periodic swings in availability, e.g., the sun may eclipse, the winds may subside, and water levels may fall due to extended periods of drought. Another difficulty is that the best locations for capturing the foregoing energy sources are often remote from where the energy is used. This is especially the case for large-scale hydropower installations. The location of hydropower installations is generally in proximity to a large body of water. An example of a large body of water is a reservoir fed by a river. Most of the remote locations near large bodies of water are already in use i.e., future growth of hydropower installations is limited.

Traditionally, most wind, solar and hydropower installations (particularly large scale, commercial operations) rely on utility grids for transferring the generated energy to where it will be used. This may not be the most efficient use of the generated energy from an economic standpoint. As is well known, connecting a wind or hydro powered turbine generator to a utility grid imposes certain constraints on the generator. For example, the power output of the generator must be synchronized (i.e., in phase) with the utility's grid supply. With synchronized generators, this is accomplished by controlling the rotor speed of the turbine to exactly match the utility supply frequency. Another constraint with relying solely on a utility grid, as a carrier of generated, energy is that there may be a low demand on the grid at the same time there is ample capacity to generate additional power. When this occurs, the energy that could be captured is simply wasted. Although various energy storage systems (e.g., battery storage, compressed hydrogen fueling tanks or pumped hydro-energy storage) can be utilized to overcome this problem. Such systems are relatively expensive to install and result in efficiency losses of their own due to the repeated energy conversions.

SUMMARY OF THE INVENTION

The disclosure delineates an intelligent renewable based system. The system has a controller with memory and a program stored in the memory. A plurality of data structures forms the program. The program data structures control a multi-tier optimization of a power grid. The power grid has connected thereto water and power generating assets and controllable loads. The multi-tier benefit optimization program maximizes the benefit generated by the renewable power generating assets, water generating assets and the controllable loads.

BRIEF DESCRIPTION OF THE DRAWINGS

Referring now to the figures wherein the like elements are numbered alike.

DETAILED DESCRIPTION

Figure 1:
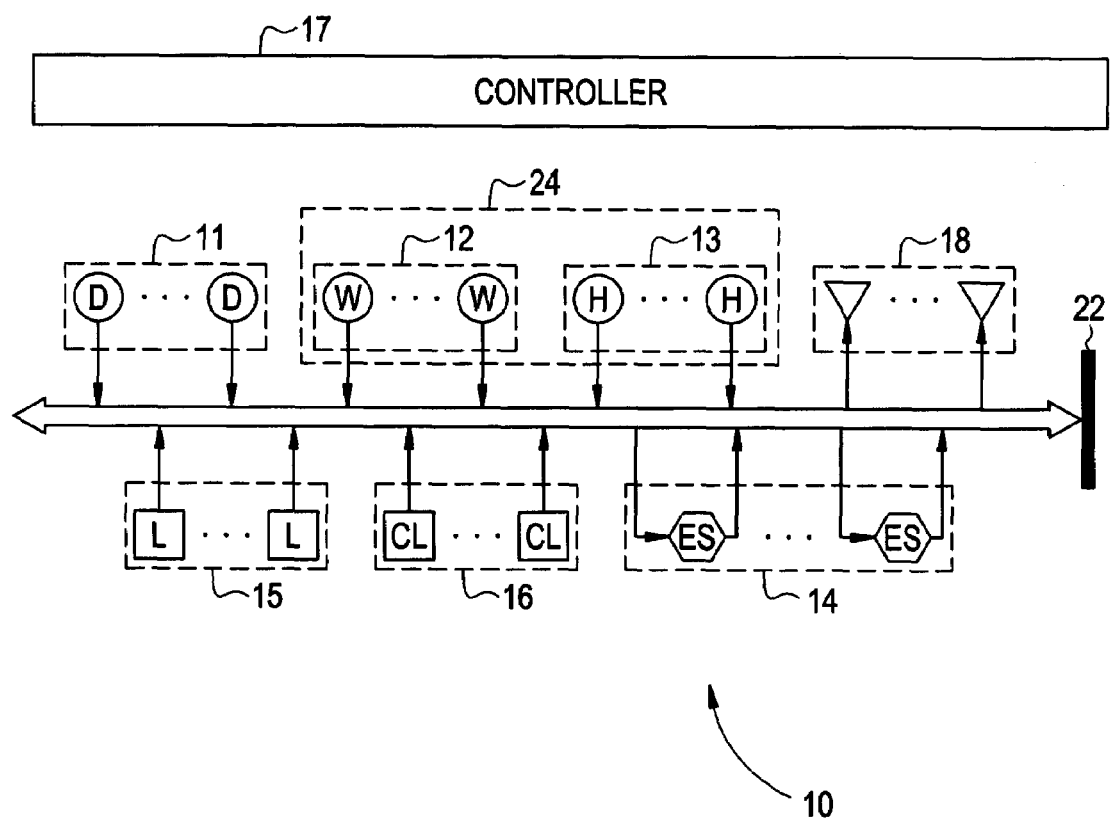
FIG. 1 illustrates a block diagram view of an exemplary wind-hydro system.

The disclosure delineates a locally controllable power grid 10, FIG. 1 that may, if desired, be connected to a utility power grid 22. Examples of locally controlled power grids are an island power grid that is not connected to one of the utility power grids or an electric ship microgrid like the power grid aboard an aircraft carrier. The local power grid 10 may, if desired, have connected thereto a fossil fueled generating asset 11 and renewable power generating assets 24. An example of a fossil fueled generating asset 11 is a diesel engine that has drive electricity producing generators. Examples of a renewable power-generating asset 24 include wind powered generating assets 12, water powered assets, water generating assets, water storage assets, hydroelectric powered generating assets 13, solar, geothermal, and hydrogen engine-generators in concert with an electorlyser plant and hydrogen storage units. If desired, energy storage units 14 capable of regenerating electric power like batteries or compressed hydrogen fueling tanks may further be connected to the local power grid 10. If desired, system load 15 and controllable loads 16 may also be connected to the local power grid 10. The local power grid 10 may, if desired, be connected to one of the utility power grids.

A controller 17, FIG. 1 commands and controls the renewable power and water generating assets and the controllable loads connected to the grid. The controller 17 receives forecasted data from the individual assets and loads delineating their present state and the expected loading and expected power demand. The controller 17, FIG. 1 has a program stored in its memory. The program has a plurality of data structures for maintaining the quality supply of electric power to the system loads 15 and controllable loads 16 by dispatching the system assets to maximize the associated multi-tier benefit system.

$$MTB_{System} = \sum_i mtb_i(P_i)$$

$$mtb_i(P_i) = \sum_j \omega_j \cdot b_j(P_i)$$

The function to be maximized is the sum of multi-tier benefits obtained from individual system assets. The multi-tier benefit arising from each individual asset can be described as a sum of weighted benefits that are each a function of power associated with the asset ($P_i$). The weight i.e., relative importance of a given benefit is described with a factor $\omega_j$ and the benefit or a penalty function (represented by a negative sign) is shown as $b_j(P_i)$.

To maximize this function, the controller 17 is in communication with fossil fueled generating assets 11, wind powered generating assets 12, hydroelectric powered generating assets 13, controllable loads 16, and energy storage units 14. In addition, each of the generating assets 11, 12, 13, the controllable loads 16 and the energy storage units 14 have their own local controllers capable of maintaining the respective stable operating points of the equipment they control. These local controllers are in communication with the controller 17. The communication link can be used to provide feedback signals to the supervisory controller, receive reference signals from the supervisory controller 17, and exchange status information to aid in remote monitoring and diagnostics. The communication link can also be used to send forecast data.

The controller 17 may, if desired, be in communication with one or more measuring instruments 18 that are connected to the local grid 10 to measure directly or indirectly voltages, currents, frequency, phase angles, active and reactive power. These measuring instruments may, if desired, provide feedback signals to further aid in optimizing the system operating point or to simply replace the measurements that cannot be collected from local controllers due to, for example, compatibility or bandwidth limitations.

Further, the controller 17 has data structures that control the generator droop. The generator droop is dynamically adjustable and it depends on the type of generator. The ultimate purpose is to maximize power extraction from the preferred sources of generation. Therefore, these sources are initially given no droop and all the primary frequency control is done in the controllable loads and energy storage assets. If these frequency controlling assets approach their limits of capacity, the droop is implemented into the preferred sources of generation that were thus far maintained flat. As such, the droop associated with the preferred sources of generation can be represented as a function of two variables i.e., the frequency and the reserve capacity of frequency controlling assets.

Operation of a traditional power system is optimized to minimize the fuel costs while maintaining the system's security and reliability. As the load varies during the day, generators are brought on and off line to meet the load demand while continuously maintaining the system security, required voltage profile, and limits of injected reactive power where applicable. The traditional optimization process considers generators' available power injections as the space for choosing control variables and it is run off-line based on the load forecast.

The controller's program optimization is in real time using the multi-tier benefit performance indicator and it is universally applicable to generation sources, controllable loads, and energy storage systems. The "multi-tier-ness" in the name means that it accounts for both direct and indirect benefits to the system. It quantifies economics of the system operation but it also includes the value of reduced emissions, value of stored energy such as the value of electrolyzed hydrogen and value of products obtained by operating electric powered equipment such as the value of potable water.

Figure 2:
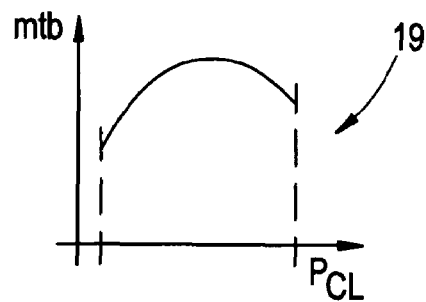
FIG. 2 illustrates a graph of controllable power versus the multi-tier benefit.

There is a general relationship 19 (FIG. 2) between the power drawn by the controllable load 16 and the associated multi-tier benefit to the system. For example, consider a desalination plant as the controllable load. The input resource is seawater and the output is clean potable water that can be assigned the specific market value. The incremental costs to run this plant are operating and maintenance costs and they are in a general case dependent on the operating point of the system. This explains the existence of the maximum in the function mtb(Pcl). Finally, dashed lines at both ends of the mtb curve represent the minimum and the maximum power at which this equipment can operate. The minimum power is perhaps associated with the standby power requirements while the maximum power corresponds to the equipment ratings and tolerable overloads. Of course, desalination is not the only possible controllable load. Other examples include air conditioning loads, irrigation systems, municipal water and sewage treatment plants, etc.

Figure 3:
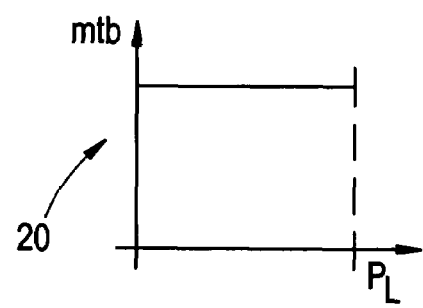
FIG. 3 illustrates a graph of an uncontrollable load versus the multi-tier benefit.

Another type of load is the uncontrollable load and its representative graph mtb($P_L$) 20, FIG. 3. Just as with the controllable loads, these uncontrollable ones will also have some quantifiable market value associated with their operation, but their mtb($P_L$) is flat because their operation cannot be controlled. Due to that flatness characteristic, it is possible to argue that they need not be included in the optimization algorithm. The benefit function does not change with the input value. The uncontrollable loads are included to facilitate making decisions about load shedding by the controller 17. Specifically, if each load is assigned the mtb curve, the controller 17 can decide to shed the loads with the lower value to the system.

Figure 4:
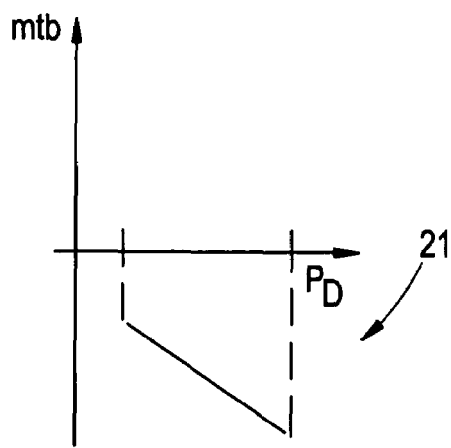
FIG. 4 illustrates a graph of a controllable power asset versus the multi-tier benefit.

A diesel generator is representative of the graph of the fossil fueled generating source 21, FIG. 4. Its operating costs are directly related to the cost of fuel. Thus, the curve has a salient linear relationship between the electric power supplied to the system and the associated multi-tier benefit. Some generating plants are combined heat and power plants; they can output both electric power and feed heat loads (e.g. municipal heating). In such situation the mtb is a function of two variables i.e. mtb=$f$(Pel, Pth). Furthermore, Pel and Pth may be subject to additional equality constraints e.g. g(Pel, Pth)=0. This does not change anything in the overall process; the optimization algorithm simply chooses a pair of values to optimize the benefit.

Figure 5:
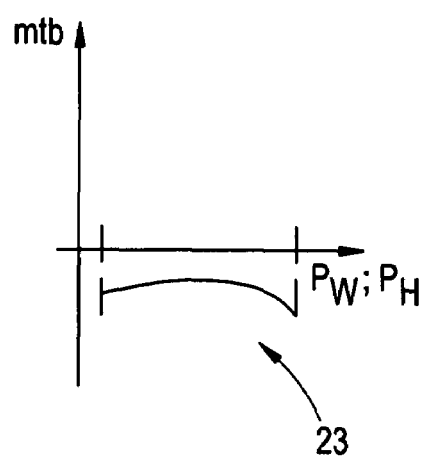
FIG. 5 illustrates a graph of a renewable power asset versus the multi-tier benefit.

The generation source 23, FIG. 5 is derived from a renewable energy source. Here too operating and maintenance costs drive the mtb curve into negative, but since the fuel is free the mtb is much less dependent on the power supplied than the corresponding mtb curve representing the fossil fueled source. The maximum on the mtb ($P_W$; $P_H$) arises from the possible optimal operating point that can further be a function of wind speed or available water flow capacity.

Figure 6:
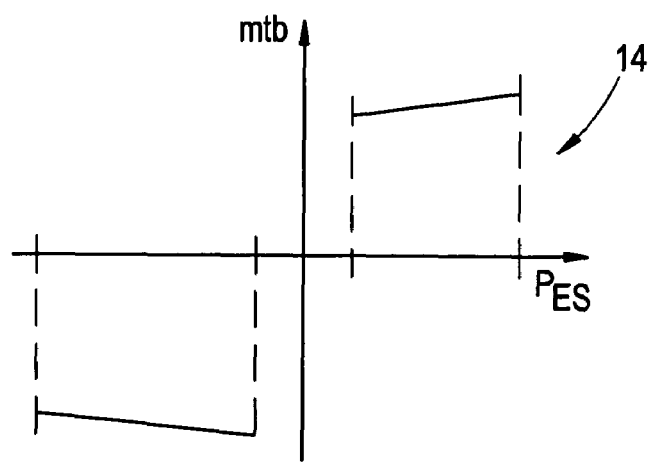
FIG. 6 illustrates a graph of an energy storage asset versus the multi-tier benefit.

Finally, the mtb as a function of power is supplied to the energy storage 14, FIG. 6. If this energy storage 14 is implemented as a hydrogen electrolysis plant with hydrogen storage and a fuel cell (or a hydrogen internal combustion engine) for regenerating power back to the local grid 10, the values can be assigned by way of assigning the value to the stored hydrogen gas. The value for stored hydrogen is readily apparent if it is sold as a fuel.

While the disclosure is in reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling with the scope of the appended claims.

What is claimed is:

1. An intelligent renewable based system comprising:
   a controller with a memory said memory having stored therein a program;
   a plurality of data structures forming said program;
   said program data structures controlling a multi-tier benefit optimization of a power grid;
   said power grid having renewable power generating assets, fossil fueled generating assets and controllable loads connectively disposed thereto; and
   said multi-tier benefit optimization program maximizes the sum of weighted direct and indirect benefits or penalties generated by said renewable power generating assets, fossil fueled generating assets and said controllable loads, such that economics of system operation and benefits or penalties of system operation unrelated to the reasons for which the system is primarily operational are quantified and together are optimized to achieve a desired multi-tier benefit.

2. An intelligent renewable based system as recited in claim 1, further comprising forecasted power demand from said renewable power generating assets being passed to said controller for benefit optimization by said program.

3. An intelligent renewable based system as recited in claim 1, further comprising forecasted water demand from said renewable power generating assets being passed to said controller for benefit optimization by said program.

4. An intelligent renewable based system as recited in claim 1, wherein said renewable power generating assets passing forecasted resource availably to said controller.

5. An intelligent renewable based system as recited in claim 1, wherein said renewable power generating asset is a hydrogen engine deriving its fuel from hydrogen storage via a desalination plant and an electrolyser.

6. An intelligent renewable based system as recited in claim 1, wherein said controllable loads are selected from a group consisting of hydrogen storage, electrolyser plant and desalination plant.

7. An intelligent renewable based system as recited in claim 1, wherein said renewable power generating assets are selected from a group consisting of wind power, hydroelectic power, solar, geothermal and hydrogen engine-generators.

8. An intelligent renewable based system comprising:
   a controller with a memory said memory having stored therein a program;
   a plurality of data structures forming said program;
   said program data structures controlling a multi-tier benefit optimization of a power grid;
   said power grid having power generating assets and controllable loads connectively disposed thereto; and
   said multi-tier benefit optimization maximizes the sum of weighted multi-tier direct and indirect benefits or penalties generated by said power generating assets and produced by said controllable loads, such that economics of system operation and benefits or penalties of system operation unrelated to the reasons for which the system is primarily operational are quantified and together are optimized to achieve a desired multi-tier benefit.

9. An intelligent renewable based system as recited in claim 8, wherein said power grid is an electric ship.

10. An intelligent renewable based system as recited in claim 8, wherein each multi-tier benefit is associated with a respective power generating asset or controllable load and comprises a sum of weighted benefits as a function of power.

11. A method for an intelligent renewable based system comprising:
    providing renewable power generating assets connectively disposed to a power grid;
    providing power loads connectively disposed to said power grid;
    optimizing said provided renewable power generating assets and said provided power loads via maximizing a sum of weighted multi-tier benefits or penalties associated with said provided renewable power generating assets and said provided power loads;
    generating power from said optimized renewable power generating assets; and
    distributing said generated power to said optimized power loads, such that economics of system operation and benefits or penalties of system operation unrelated to the reasons for which the system is primarily operational are quantified and together are optimized to achieve a desired multi-tier benefit.

12. A method for an intelligent renewable based system as recited in claim 11, wherein providing renewable power generating assets comprises:
    providing water generating assets;
    providing water loads;
    providing storage assets;
    generating water from said provided water generating assets;
    storing water via said storage assets;
    generating power from said stored water; and
    distributing said generated power to said provided water loads.

13. A method for an intelligent renewable based system in claim 11, wherein said power loads are controllable.

14. A method for an intelligent renewable based system as recited in claim 11, wherein maximizing a sum of weighted multi-tier benefits or penalties associated with said provided renewable power generating assets and said provided power loads comprises maximizing a sum of weighted multi-tier benefits or penalties as a function of power.

15. A method for an intelligent renewable based system as recited in claim 11, wherein said renewable power-generating assets are selected from a group consisting of wind power, hydroelectric power, and energy storage.

16. A method for an intelligent renewable based system as recited in claim 11, further comprising maximizing extraction of power from renewable power generating assets based on adjustable droop characteristics.

17. A method for an intelligent renewable based system as recited in claim 12, wherein said water-generating assets are selected from a group consisting of desalination of seawater and water storage.

18. A method for an intelligent renewable based system as recited in claim 13, wherein said controllable loads are desalination plants.

19. A method for an intelligent renewable based system as recited in claim 15, wherein said energy storage units are compressed hydrogen fueling tanks in communication with said hydrogen engine-generators.

20. A method for an intelligent renewable based system as recited in claim 11, further comprising providing fossil fueled power generating assets connectively disposed to the power grid.

21. A method for an intelligent renewable based system as recited in claim 20, wherein said fossil fueled asset is a diesel engine-generator.

* * * * *